Patented Aug. 8, 1933

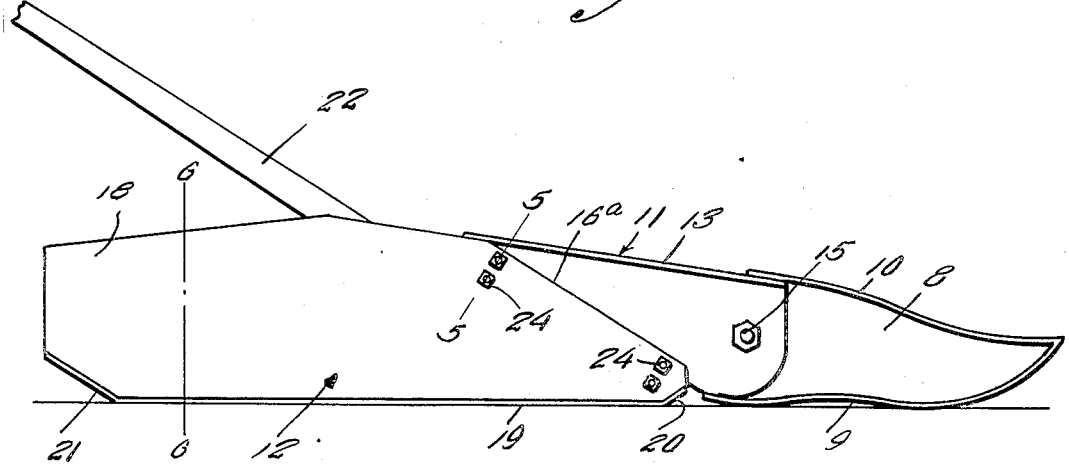
Fig. 1.
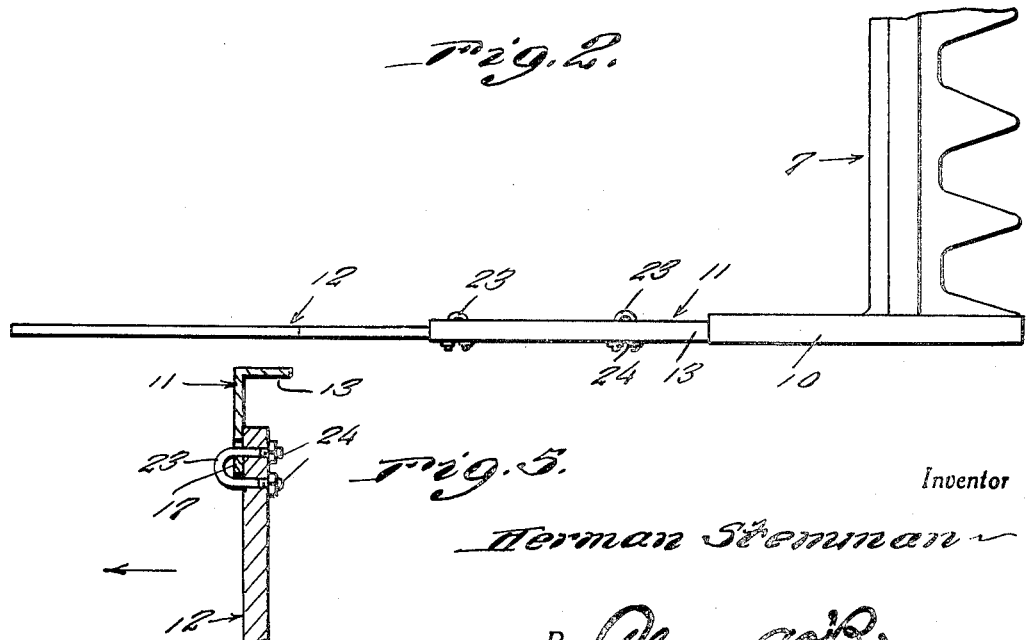
Fig. 2.
Fig. 3.
Inventor
Herman Stemman
By Clarence A. O'Brien
Attorney

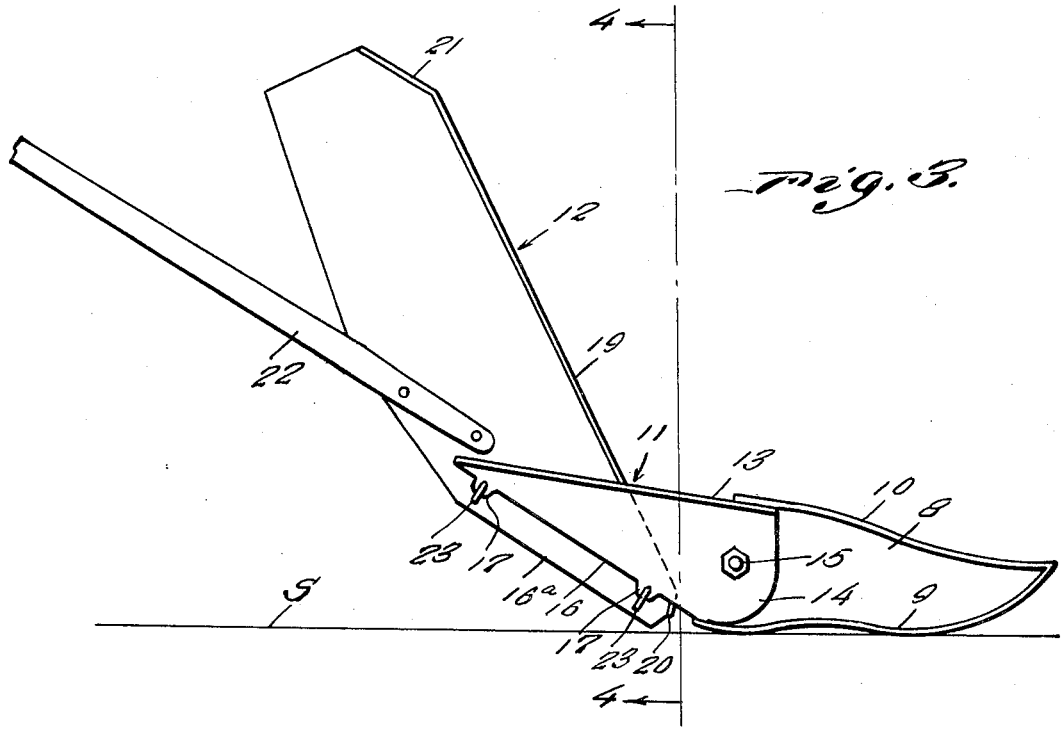
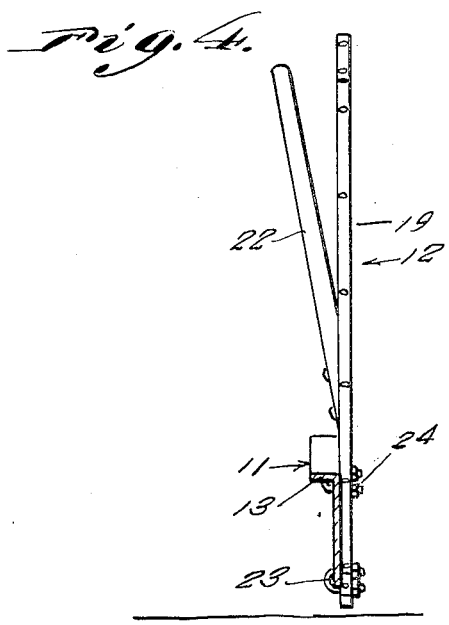
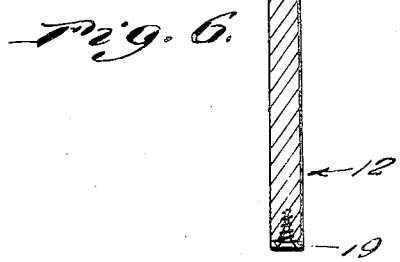

1,921,952

UNITED STATES PATENT OFFICE 1,921,952

SICKLE BAR DIVIDER ATTACHMENT

Herman Stemman, Stevensville, Mont.

Application February 9, 1933. Serial No. 655,979

4 Claims. (Cl. 56—314)

This invention relates to a structurally refined and improved sectional divider designed for attachment to the drag shoe on the outer end of a sickle bar such as is used on hay and grain mowing machines.

By way of introduction I would say that these dividers are referred to in the trade and prior art as grass boards, divider boards and the like. Moreover it is conceded that the broad proposition of utilizing an automatically collapsible or foldable divider constructed of complemental sections is not new. In fact it is admittedly old to employ inwardly and outwardly swingable boards to guard against breakage and to obviate needless replacements and repairs.

Notwithstanding the aforesaid contributions to the prior art, I have discovered the need for a structure which is characterized by sensitivity of action and wherein the principal feature of novelty and refinement is predicated upon the adoption of a combination metal and wood arrangement wherein the wood section is freely swingable from its normal horizontal or working position inwardly and upwardly to an out of the way position through the instrumentality of an adequately designed and appropriately fashioned hinge connection between the companion metal and wood section.

It follows therefore that my primary aim is to generally improve upon prior art and marketed divider boards by providing a structure which is more satisfactory and efficient in performance, positive and dependable in swinging action, strong and durable, economical and otherwise developed to supply a long felt need in this particular line of endeavor.

Other features and advantages of the invention will become more readily apparent from the following description and drawings.

In the drawings:

Figure 1 is a side view showing the complete structure and the manner in which it is attached to the sickle bar drag shoe.

Figure 2 is a top plan view of the structural assembly shown in Figure 1.

Figure 3 is a view similar to Figure 1 showing the position assumed by the board when it is automatically swung inwardly and upwardly to an out of the way indestructible position.

Figure 4 is a view taken approximately on the plane of the line 4—4 of Figure 3 looking in the direction of the arrows.

Figures 5 and 6 are detail sections on the lines 5—5 and 6—6 respectively of Figure 1.

In the drawings in Figure 2 the numeral 7 designates a conventional cutter or sickle bar such as used on hay and grain mowing machines of the type with which the invention is associated. As is customary this is provided at one end with a suitably shaped drag shoe 8 here shown as formed with a bottom runner flange 9 and a top edging and reinforcing flange 10.

The improved divider attachment is characterized primarily by two distinguishable parts or companion sections 11 and 12 respectively. The section 11 is in the form of a metal attaching plate which is approximately V-shaped in outline. The upper edge of this is formed with a reinforcing flange 13 and the rounded or frontal end portion 14 is fitted in between the two flanges 9 and 10 and bolted in place as indicated at 15, the flange 13 bearing against the flange 10 in overlapped relationship to provide a dependable and positive connection. The lower edge portion of the plate indicated at 16 is disposed somewhat diagonally to the surface or ground S. On this lower edge at longitudinally spaced points are lobe-like extensions which are apertured to form jointing ears 17.

The relatively movable or swingable section 12 is actually in the form of a substantially rectangular board 18 of appropriate dimension thickness, the same having one edge portion cut off diagonally as indicated at 16a to cooperate with the adjoining edge 16 of the stationary attaching plate 11. On its lower edge the board is provided with a metal facing strip 19 which functions as a runner to facilitate the requisite gliding action. The frontal or foremost corner portion of the board is cut off as at 20 to provide clearance and to facilitate folding. Likewise the extreme rear edge portion 21 is cut off diagonally that is upwardly and rearwardly with respect to the ground to afford a second clearance portion so that when the cutter bar is moved rearwardly the edge portion 21 will engage the grain producing the requisite cam lifting action for turning the board inwardly and upwardly to impart the initial swing thereto. The upper and remaining edge portions of the board may be of any appropriate configuration. Moreover the board is provided with the customary grain arm or stick 22 as is usual.

Particular attention is now invinted to the special sensitive hinge or jointing connection between the sections 11 and 12. This is accomplished through the medium of simple U-shaped connecting or hinge bolts 23 carrying retaining nuts 24 as shown in detail in Figure 5. The bolts are connected to the board and ears 17 in such a way that when the board is in running position the diagonal edge portion 16a overlaps the companion edge portion 16 of the metal attaching plate 11. This arrangement is designed for stability and reinforcing purposes as is obvious whereby to permit the board to assume a normal alined position with respect to the attaching plate and guard 8 while at the same time permitting a quick breaking hinge joint action affording the requisite sensitivity of swinging motion of the board from the position shown in Figure 1 toward the position shown in Figure 3.

Manifestly the board is swung to the out of way inward and upward position under pressure of the contacting grain and obstructions in the path of movement of the machine during turning movement of the machine. Likewise owing to the presence of the lifting corner 21 it is started into this folding or swinging action by rearward movement of the machine caused when backing the machine to take a new swath. It is evident also that when the pressure is relieved against the board it drops automatically and by gravity down to its normal operating or gliding position shown in Figure 1.

The principal novelty is predicated upon the use of a combination metal and wood structure wherein the metal part 11 serves as a connection of the board with the guard 8 and wherein the part 11 is suitably reinforced through the agency of a flange 13 to make the connection more secure. The shape of the part 11 is believed to be novel in its association with the peculiarly shaped swinging board 12. Then too additional novelty is found in the presence of the longitudinally spaced attaching ears 17 to accommodate the suspension and hinge U-bolts 23. Further novelty is predicated on the substantially rectangular freely swingable board 12 equipped with a metal runner 19 wherein said board has its forward and rear lower edge portions cut off in proper diagonal directions to facilitate clearance and to aid in swinging and lowering movement of the board. Particular stress is laid on the overlapped coaction between the edges 16 and 16a and the highly sensitive joint afforded between the board and plate through the instrumentality of the nonbinding and free acting U-bolt hinge connection and overlapped relationship of the abutting surfaces 16 and 16a as shown in Figure 5. This overlapped arrangement permits the board to lie in contact with the attaching plate and to move in the proper manner when dragged along the ground while at the same time permitting the quick breaking or hinge action necessary when the mower machine is turned or backed.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. A sickle or cutter bar attachment comprising an attaching plate adapted to be connected with a drag shoe, said attaching plate being of general triangular configuration so that the lower edge portion thereof occupies a position diagonal to the ground when in place, a complemental divider board, the frontal and upper edge portion of said board being cut diagonally to substantially parallel the lower diagonal edge portion of said plate, and a hinge connection between the board and plate joining the diagonal edge portions of the board and plate in overlapping association when the board is in operative position.

2. A sickle or cutter bar attachment comprising an attaching plate adapted to be connected with a drag shoe, said attaching plate being of general triangular configuration so that the lower edge portion thereof occupies a position diagonal to the ground when in place, a complemental divider board, the frontal and upper edge portion of said board being cut diagonally to substantially parallel the lower diagonal edge portion of said plate, and a hinge connection between the board and plate joining the diagonal edge portions of the board and plate in overlapping association when the board is in operative position, the lower frontal edge portion of said board being cut off diagonally for clearance purposes.

3. A sickle or cutter bar attachment comprising an attaching plate adapted to be connected with a drag shoe, said attaching plate being of general triangular configuration so that the lower edge portion thereof occupies a position diagonal to the ground when in place, a complemental divider board, the frontal and upper edge portion of said board being cut diagonally to substantially parallel the lower diagonal edge portion of said plate, and a hinge connection between the board and plate joining the diagonal edge portions of the board and plate in overlapping association when the board is in operative position, the lower frontal edge portion of said board being cut off diagonally for clearance purposes, and the rear lower corner or edge portion of the board being cut off diagonally with respect to the ground to initiate swinging movement of the board when the drag shoe is backed.

4. A sickle or cutter bar attachment comprising a substantially triangular attaching plate for connection to a drag shoe, said plate being formed on its upper edge with a reinforcing flange, the lower edge thereof being provided at longitudinally placed points with apertured attaching ears, a companion substantially rectangular divider board provided on its lower edge with a runner, the frontal upper edge portion of said board being cut diagonally to substantially parallel the correspondingly shaped edge portion of the plate, and U-bolts carried by said board and hingedly connected with said ears permitting the board to move into overlapping relationship with respect to the plate when the board is in operating position.

HERMAN STEMMAN.